US010327385B2

(12) United States Patent
Schmid

(10) Patent No.: US 10,327,385 B2
(45) Date of Patent: Jun. 25, 2019

(54) SELF-PROPELLED HARVESTING MACHINE

(71) Applicant: Walter Schmid, Niederstotzingen (DE)

(72) Inventor: Walter Schmid, Niederstotzingen (DE)

(*) Notice: Subject to any disclaimer, the term of this patent is extended or adjusted under 35 U.S.C. 154(b) by 0 days.

(21) Appl. No.: 15/503,307

(22) PCT Filed: Jul. 31, 2015

(86) PCT No.: PCT/EP2015/067689
§ 371 (c)(1),
(2) Date: Feb. 10, 2017

(87) PCT Pub. No.: WO2016/023774
PCT Pub. Date: Feb. 18, 2016

(65) Prior Publication Data
US 2017/0223896 A1 Aug. 10, 2017

(30) Foreign Application Priority Data
Aug. 13, 2014 (DE) .................. 10 2014 216 112

(51) Int. Cl.
*A01D 61/00* (2006.01)
*A01D 67/00* (2006.01)
(Continued)

(52) U.S. Cl.
CPC ............ *A01D 61/008* (2013.01); *A01B 73/00* (2013.01); *A01D 41/02* (2013.01); *A01D 41/12* (2013.01);
(Continued)

(58) Field of Classification Search
CPC ........ A01B 73/00; A01D 17/10; A01D 33/10; A01D 41/02; A01D 41/06; A01D 41/12;
(Continued)

(56) References Cited

U.S. PATENT DOCUMENTS 2,633,685 A * 4/1953 Edwards ................ A01D 17/10
171/25
5,772,503 A 6/1998 Janzen
(Continued)

FOREIGN PATENT DOCUMENTS

DE 25 33 757 2/1977
DE 197 10 172 9/1998
(Continued)

OTHER PUBLICATIONS

International Search Report and Written Opinion dated Nov. 2, 2015 in PCT/EP2015/067689.
(Continued)

*Primary Examiner* — Robert E Pezzuto
(74) *Attorney, Agent, or Firm* — Faegre Baker Daniels LLP

(57) ABSTRACT

The invention relates to a self-propelled harvesting machine comprising: —a removable harvesting unit (6) which can be mounted at the front in the direction of travel (F); —a processing unit in the interior; and —a harvested material conveyor channel (5) connecting said harvesting unit, when mounted, to the processing unit. According to the invention, the self-propelled harvesting machine is characterized in that a receiving space which at least partially receives said conveyor channel when in the harvesting mode can have its width adjusted transversely to the direction of travel.

12 Claims, 3 Drawing Sheets

(51) Int. Cl.
*A01F 12/10* (2006.01)
*F16C 35/073* (2006.01)
*F16C 25/08* (2006.01)
*A01B 73/00* (2006.01)
*A01D 41/02* (2006.01)
*A01D 41/12* (2006.01)

(52) U.S. Cl.
CPC ............... *A01D 67/00* (2013.01); *F16C 25/08* (2013.01); *F16C 35/073* (2013.01); *F16C 2326/24* (2013.01)

(58) Field of Classification Search
CPC ....... A01D 61/008; A01D 67/00; A01F 12/10; B60B 33/0071; B60B 33/0068; B60B 33/04; B60B 33/045; B60G 5/025; B60G 9/02; B60G 11/24; B60G 11/225; B60G 17/005; B62D 1/16; F16C 25/08; F16C 35/073
USPC ......... 56/153; 180/6.48; 280/124.111; 460/8, 460/16, 70, 119
See application file for complete search history.

(56) References Cited

U.S. PATENT DOCUMENTS

| | | | |
|---|---|---|---|
| 7,234,291 B2* | 6/2007 | Rickert | A01D 41/142 |
| | | | 56/12.6 |
| 7,555,884 B2 | 7/2009 | Janning | |
| 8,280,590 B2* | 10/2012 | Mackin | A01D 41/12 |
| | | | 701/41 |
| 9,168,784 B2* | 10/2015 | DeChristopher | B60B 33/0068 |
| 2010/0230182 A1* | 9/2010 | Otto | B60B 33/045 |
| | | | 180/6.48 |

FOREIGN PATENT DOCUMENTS

| | | |
|---|---|---|
| EP | 1 226 745 | 7/2002 |
| EP | 1 808 063 | 7/2007 |
| GB | 1 498 930 | 1/1978 |

OTHER PUBLICATIONS

Office Action dated Apr. 10, 2018 in corresponding European Application No. 15 744 922.4.

* cited by examiner

SELF-PROPELLED HARVESTING MACHINE

CROSS-REFERENCE TO RELATED APPLICATION

The present application is a National Stage of International Application No. PCT/EP2015/067689, filed Jul. 31, 2015, and which claims priority to DE 10 2014 216 112.6, filed Aug. 13, 2014, the entire disclosures of which are hereby expressly incorporated herein by reference.

BACKGROUND/SUMMARY

The invention relates to a self-propelled harvesting machine according to the type further defined in the preamble of claim 1.

A self-propelled harvesting machine, in particular a combine harvester or also a beet harvester are known from the general prior art. Such self-propelled harvesting machines typically comprise a removable harvesting unit, which can be mounted at the front in the direction of travel. In general, this removable harvesting unit is mounted for the harvesting mode in the field and can be dismounted for the drive mode on public roads. In a combine harvester, this harvesting unit is designed in such a way, for example, that the harvesting unit cuts the stems, wherein the stems are kept upright by a so-called decoiler and supplied to the mower. Typically, the harvesting unit further comprises a conveying screw which conveys the cut stems to the central region of the harvesting unit.

The further processing of the harvested material, for example threshing in the case of a combine harvester, in fact the separation of grains and stems as well as subsequent processing steps such as sieving and chaffing of the stems or the like, is effected in a processing unit in the interior of the harvesting machine. Here, the harvesting unit, in the mounted state, is connected to the processing unit via a conveying channel for the harvested material. The conveying channel can assume the conveyance of the harvested material via conveyor belts or star conveyors. A beet harvester has a very similar structure, in which at the front region, the green waste is cut-off and the beets are harvested and are then conveyed, to the processing unit via the conveying channel, in which unit most of the earth and dirt is shaken off the beets, and the beets can be collected in storage volumina.

The self-propelled harvesting machines can be equipped with a very wide harvesting unit as to harvest in a very efficient manner, that is to harvest a comparatively large area in a short time. As these harvesting units are too wide for a drive mode of the self-propelled harvesting machine on public roads, as the width is typically limited to 3 m max in this case, these units are dismounted for the drive mode. The conveying channel can be lifted for the drive mode in general at the front in the direction of travel so as not to pose a risk to other road users.

Comparably big wheel arrangements are common to be capable to drive with such a self-propelled harvesting machine in the field and thereby not to compress the ground in an unnecessarily intense manner. To that end, big and wide single wheels or twin wheels or possibly also track chains or crawler tracks are typically used. These wheel arrangements are mostly designed in a width of overall at least 60 cm of each of the wheel arrangements to keep the surface pressure of the self-propelled harvesting machine as low as possible on the field. Even with a special permit, an overall width of 3 m is the maximum, if the self-propelled harvesting machine needs to be moved in public traffic. Thus, due to the required width of the wheel arrangements as well as of the necessary drives of the conveying channel, only a maximum width of the conveying channel in the range of about 1.5 m is possible. As the harvested material, in particular the harvested material conveyed through the conveying channel in the type of a mat in a combine harvester, can not or only in a limited manner be widened in its width upstream the conveying channel, the operating machines of the processing unit are typically designed in the same width or only by a few percent wider than the conveying channel. In the end, the harvesting performance is limited by the maximum width of the conveying channel which width is restricted by the requirements of the road traffic regulations. This constitutes a significant disadvantage as thereby longer harvesting times are required per area unit, which in turn is accompanied with an increased fuel consumption as well as increased machine and labor costs.

It is now the object of the present invention to provide a self-propelled harvesting machine which avoids these disadvantages and ensures a high harvesting performance and at the same time the opportunity to drive the self-propelled harvesting machine on public roads.

According to the invention, this object is achieved by a self-propelled harvesting machine having the features of claim 1. Advantageous embodiments and developments result from the dependent sub-claims thereof.

In the self-propelled harvesting machine according to the invention, it is provided that a receiving space at least partially receiving the conveying channel in the harvesting mode is adjustable in its width transversely to the direction of travel. Such a receiving space adjustable in its width transversely to the direction of travel for the conveying channel enables using a much wider conveying channel than in the common existing self-propelled harvesting machines. In particular, the receiving space can be adjusted to its small width transversely to the direction of travel to drive with the self-propelled harvesting machine in a drive mode on public roads. In this situation, the conveying channel is not present in the receiving space so that the latter can as a whole be designed wider than the receiving space in its width provided for the drive mode on public roads. When driving the self-propelled harvesting machine on a field then, the receiving space can accordingly be adjusted, i.e. extended, in the width thereof. It may receive the conveying channel then, so that as a result, use of a conveying channel becomes possible, which is much wider than the conveying channels according to the prior art. Given this, an enlargement of the receiving space for the conveying channel to a width of about 2 m is sufficient for the use of the conveying channel with a significant higher capacity. Following such a conveying channel having a greater width in the harvesting mode, all subsequent operating machines of the processing unit can be set to such a greater width in the interior of the self-propelled harvesting machine, so that a significant increase in the harvesting performance can be achieved due to the opportunity of using a wider conveying channel and thus a wider processing unit, without that the self-propelled harvesting machine becomes wider in the drive mode on public roads. This is a decisive advantage in combine harvesters, but basically as well in beet harvesters and the like.

According to a very advantageous further development of the self-propelled harvesting machine according to the invention, it can further be provided that the receiving space is arranged between two wheel units located to the right and to the left of the receiving space. These wheel units may consist, for example, like in a common combine harvester, of two driven non-steered wheels in the front region of the self-propelled harvesting machine. Alternative wheel units are conceivable as well, for example twin wheels or double wheels following one another in the direction of travel or the like. Here, the right-sided and the left-sided wheel units are adjustable in the distance to one another, so that the receiving space changes in its width. In this particularly preferred version of the self-propelled harvesting machine, the front wheels or the wheel units of the front wheels, in the case of twin wheels, can be used and can be moved outwards from a position provided for the drive mode on public roads for the harvesting mode. This can in particular be effected hydraulically, i.e. can be controlled from the operator platform of the self-propelled harvesting machine. The outward hydraulic extension or the lateral extraction of the wheel units then creates additional space between the two wheel units in the region of the receiving space for the conveying channel, so that a conveying channel can be used which is significantly wider than the width of the receiving space in the mode provided for driving on public roads. Correspondingly, the processing unit can also be designed wider. As it is typically arranged behind the front wheel units, the width thereof is not limited by the wheels, so that the unit can be mounted smoothly up to a maximum width of about 2.50 m, as there is still sufficient space on the right and on the left for drives, flaps and the like without that the self-propelled harvesting machine exceeds the permitted overall width of 3 m for driving on public roads.

Basically, according to an advantageous development of the self-propelled harvesting machine, the conveying channel can be mounted in a removable manner. Similar to the harvesting unit, the conveying channel can be dismounted and be transported independently of the rest of the self-propelled harvesting machine, and can then be connected to the harvesting machine in situ in the field after the receiving space for the conveying channel has been widened. However, this is overall comparably elaborate, so that, according to an advantageous development of the idea, the conveying channel is adjustable in height at least at the front in the direction of travel. Such a conveying channel adjustable in height is known and common according to prior art in self-propelled harvesting machines, in particular in combine harvesters. In self-propelled harvesting machine according to the invention, such a conveying channel can be mounted. According to an advantageous development of this idea, it can be located in the upper height above the wheel units, so that the lifted conveying channel is above the wheel units in the drive mode. These units thus can be displaced into their position having the smaller width. In this situation, the conveying channel is arranged above its receiving space for the harvesting mode. If the self-propelled harvesting machine arrives on a field, then the wheel units can be displaced outwardly, so that the receiving space for the conveying channel has the greater width in the harvesting mode. Now, the conveying channel arranged in its upper height above the wheel units can be lowered and fits smoothly in the now widened receiving space, although its width is greater than the width of the receiving space in the drive mode. Subsequently, the harvesting unit can be connected to the conveying channel in the manner well known per se, and the self-propelled harvesting machine can be operated with a correspondingly high harvesting performance.

An additional or alternative configuration of the self-propelled harvesting machine further provides that the conveying channel is designed to be adjustable in its width. Conveyor belts or so-called star conveyors are typically used in the conveying channel for conveying the harvested material. Star conveyors as well as conveyor belts can be designed displaceable to one another transverse to the conveying direction. In a star conveyor, they can engage one another up to a certain extent, so that the width of the conveying channel can be adjusted. For example, the use of two conveyor belts positioned one underneath the other in transverse direction is conceivable, which can be driven into one another when decreasing the overall width of the conveying channel. It is also conceivable to design a conveyor belt of individual rod-shaped elements which are in each case designed extendable, so that the overall width of the conveying channel and the conveying means located therein is adjustable and can be adapted correspondingly from a narrow position for the drive mode in a wide position for the harvesting mode.

As already mentioned, the wheel units can consist of one or multiple individual wheels. According to an advantageous further development of the self-propelled harvesting machine according to the invention, it can further be provided that each of the wheel units comprises multiple wheels arranged offset one another in the direction of travel and/or in height. These wheels arranged offset in the direction of travel and/or in height can for example be two wheels arranged one after the other to realize nevertheless a low surface compression of the self-propelled harvesting machine onto the field ground. In particular, wheels arranged in such a way can be surrounded by a track chain, however, according to an advantageous configuration of the idea according to the invention. Such a track chain or crawler track around multiple wheels arranged offset in the direction of travel and/or in height is a particularly elegant solution to minimize the forces applied to the surface of the cropping soil as those forces are distributed very evenly over a very large surface when using the track chain. At the same time, the wheels of such a crawler arrangement can be designed as wheel unit having a comparably small diameter. Thereby, each of the wheel units designed from such a crawler arrangement becomes comparably small in height, in particular compared to an individual wheel configuring the wheel unit which needs to be designed correspondingly bigger to achieve the same force distribution on the contact surface. This enables realizing the above-mentioned structure by a comparably short distance for lifting the conveying channel, in which structure the conveying channel comes to rest above the decreased receiving space for the conveying channel in the harvesting mode in the drive mode on public roads of the self-propelled harvesting machine.

As already mentioned, all adjustments can ideally be effected via hydraulic actuator units as those are common anyway in the field of farm machines and well-tried in use. Via corresponding control mechanisms and switches, it can be prevented that in the drive mode, for example, the wheel units are extracted outward or that lowering the conveying channel is effected before the wheel units have reached their outer final position if the conveying channel is designed as a conveying channel pivotable in height.

BRIEF DESCRIPTION OF THE DRAWINGS

Further advantageous configurations of the self-propelled harvesting machine according to the invention result from the exemplary embodiment which is described hereinafter in greater detail with reference to the figures.

The figures show in.

DETAILED DESCRIPTION

Figure 1:
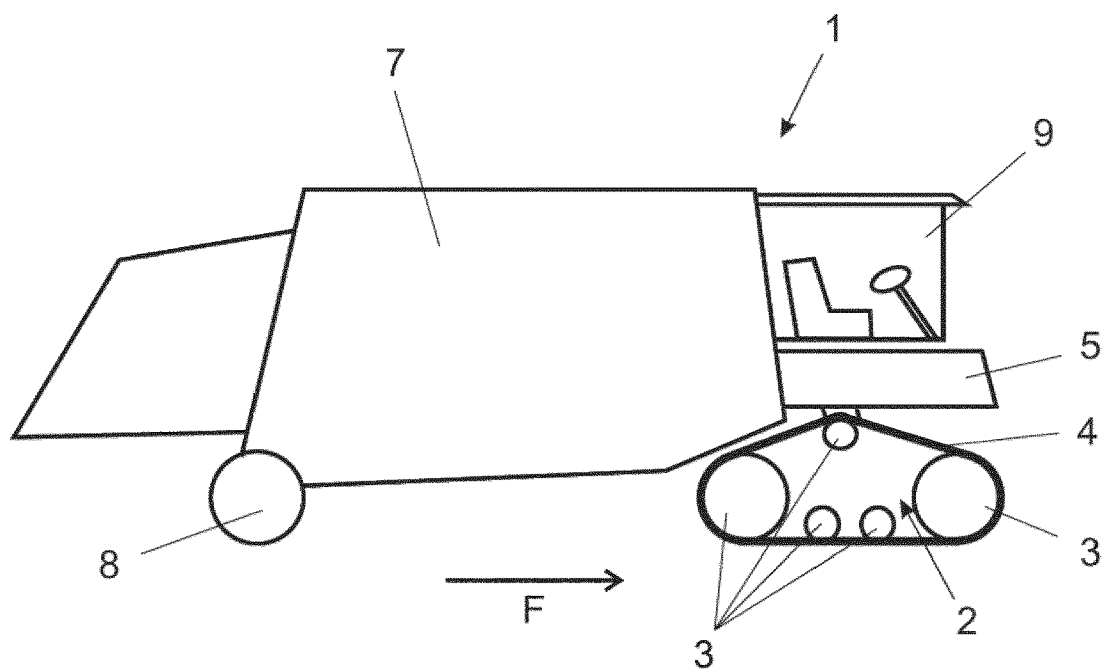
FIG. 1 a side view of a possible embodiment of a self-propelled harvesting machine in the drive mode.

In the illustration in FIG. 1, a self-propelled harvesting machine is illustrated in principle using the example of a schematically indicated combine harvester 1. The self-propelled harvesting machine 1 in the side view illustrated in FIG. 1 is to be in a mode for driving on a public road. To that end, a right-sided front wheel unit 2 can be discerned in the front region in the direction of travel F of the harvesting machine 1, which wheel unit, in the illustrated exemplary embodiment, is designed as a crawler arrangement with multiple wheels 3 as drive and guide wheels as well as a track chain or crawler track 4. This structure of the wheel unit 2 as a crawler arrangement comes with the advantage that it can be designed comparably small in the overall height with a very good force distribution on the cropping soil. In the illustration of FIG. 1, a conveying channel 5 can be recognized above this wheel arrangement 2 which channel can be connected to a harvesting unit 6 not shown in the harvesting mode and which channel conveys the harvested material harvested via the harvesting unit 6 to a processing unit 17 arranged in the interior of the harvesting machine 1 and not discernable here. The processing unit 17 is arranged in the interior of the harvesting machine 1, in particular in the region of the structure denoted with 7. So far, this structure corresponds to the prior art, the processing unit 17, however, as will be described in greater detail below, is executed wider in its type of construction than the processing units common in the prior art. A steerable wheel 8 is recognizable in the rear region of the harvesting machine 1, in particular, the harvesting machine 1 will comprise two steerable wheels in this region, wherein the wheel discernable here correspondingly covers the wheel located on the opposite side. Furthermore, a driver's cab indicated with 9 is indicated in principle over the conveying channel 5 and prior to the structure 7 in direction of travel F. In this driver's cab 9, the driver/operator of the self-propelled harvesting machine 1 takes a seat to steer it on public roads in the operating mode illustrated in FIG. 1.

Figure 2:
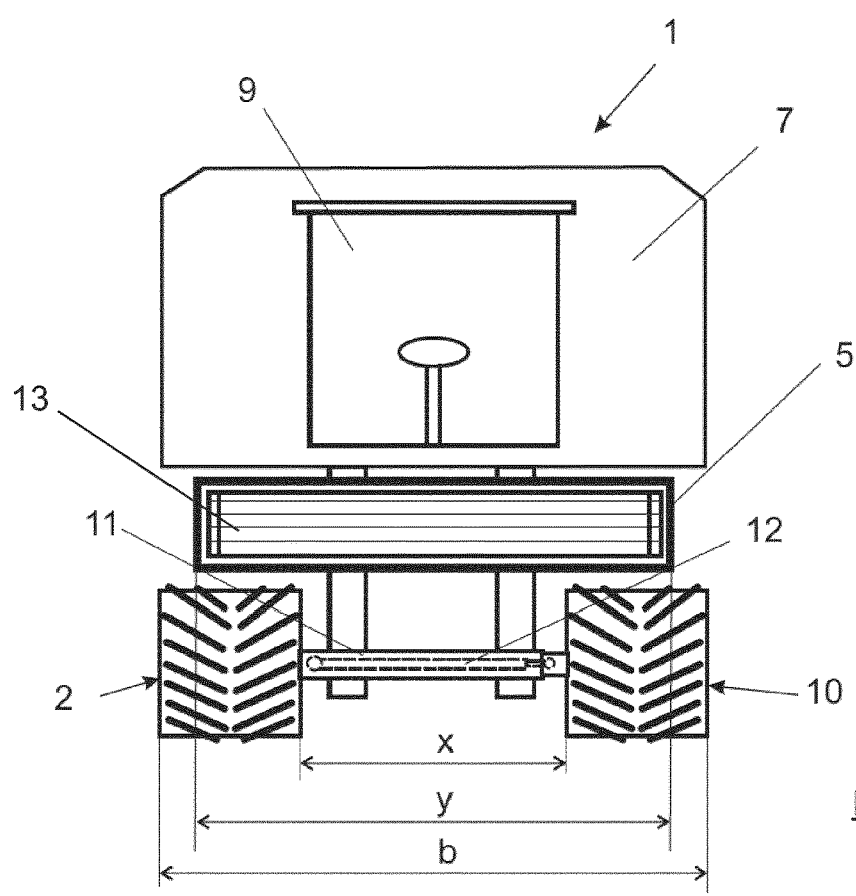
FIG. 2 a front view of the harvesting machine according to FIG. 1 in the drive mode.

The illustration of FIG. 2 shows a view of the same harvesting machine 1 in the same operating mode, as shown in the illustration of FIG. 1, in a view from the front. In the center, the operator platform 9 can be discerned here as well, wherein the structure 7 correspondingly laterally projects beyond the driver's cab 9 to the right and to the left. Here, the overall structure has a width of, for example, 3 m which is exemplary indicated by the width denoted by b. This is the maximum width permitted for driving on public roads and therefore is common usage as limiting dimension in such self-propelled harvesting machines 1. In the principle illustration of the self-propelled harvesting machine 1 in a view from the front, a left-sided wheel unit 10 is furthermore discernable in addition to the right-sided wheel unit 2. Between this the right-sided wheel unit 2, always viewed in the direction of travel F of the self-propelled harvesting machine 1, and the left-sided wheel unit 10 there is an indicated axle 11, which is adjustable in its width by an indicated hydraulic cylinder 12.

The maximum allowable width b for the drive mode on public roads is indicated in the illustration of FIG. 2. If the harvesting machine 1 arrives on a field, the two wheel units 2, 10 can be displaced outward via the extendable axle 11 via the hydraulic cylinder 12. This mode of the self-propelled harvesting machine 1 can be discerned in the illustration of FIG. 3. The overall width B, from the outer edge of the left-sided wheel unit 10 to the outer edge of the right-sided wheel unit 2, is now greater than width b and this not permitted any more for operation on public roads. At the same time, it can be discerned in the illustration of FIGS. 2 and 3, that a receiving space for the conveying channel 5 between the two wheel units 2, 10 merely has the width x for the drive mode on public roads. This width is smaller than the width y of the conveying channel 5. Thus, the conveying channel 5 can only be held in its upper position discernable in the illustration of FIG. 2 while in the drive mode on public roads. In this position, the harvesting unit is ca not be mounted, which is not necessary for driving on public roads, though.

Figure 3:
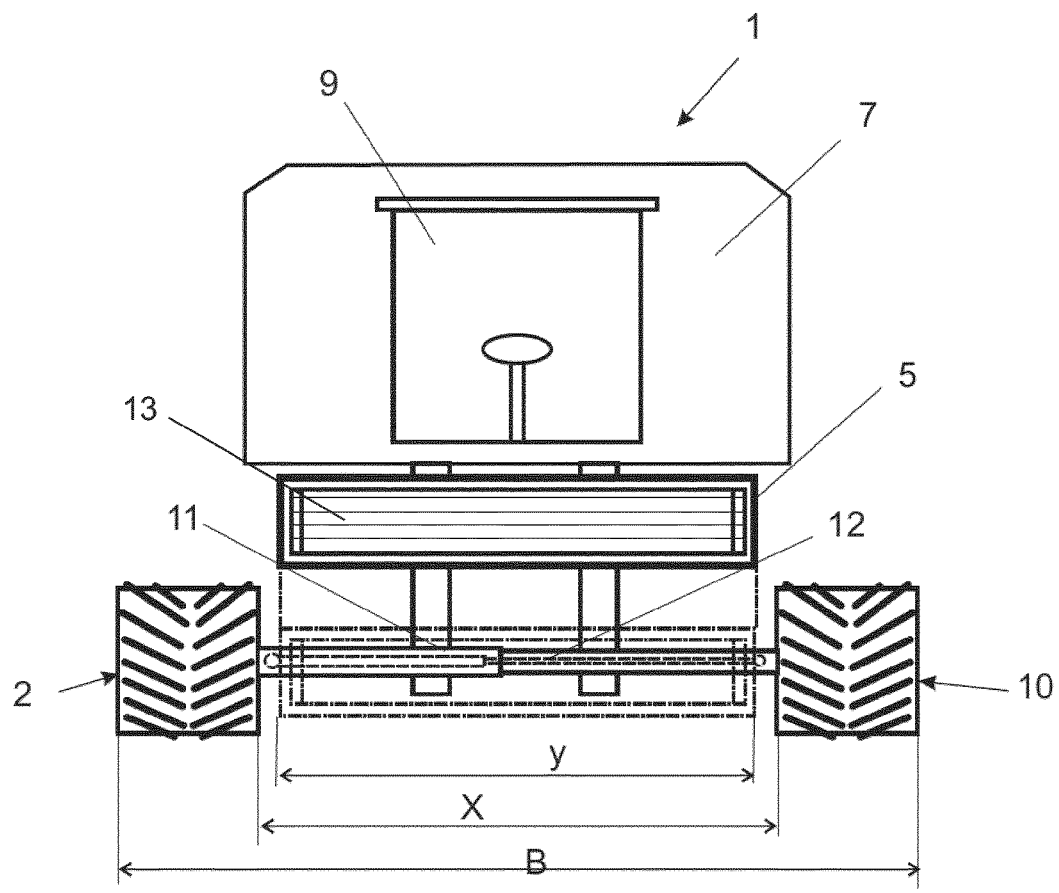
FIG. 3 a front view of the harvesting machine according to FIG. 2 in preparation for the harvesting mode.
Figure 4:
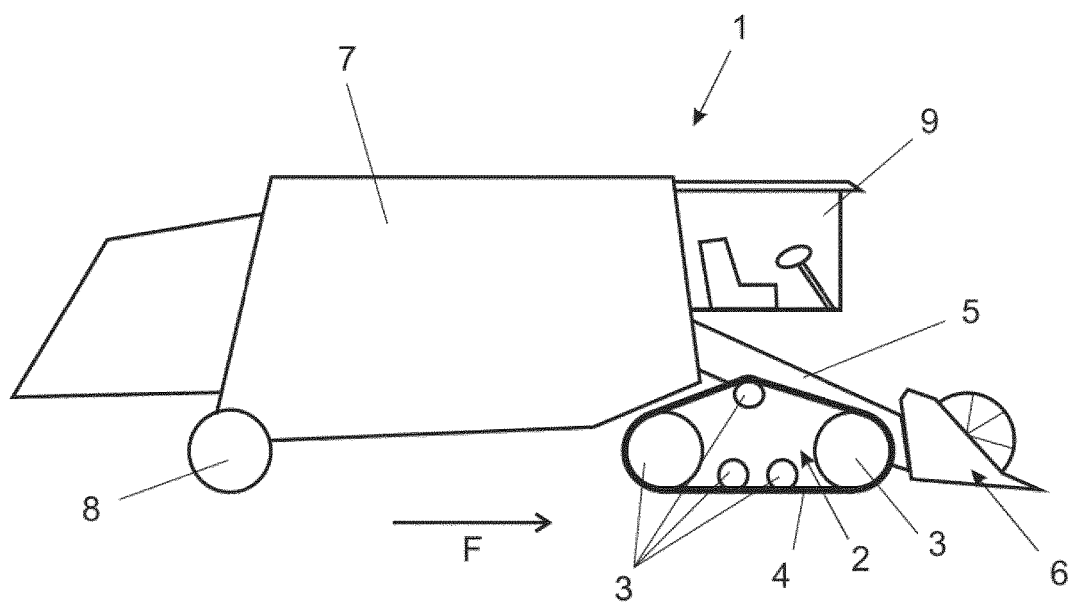
FIG. 4 a side view of the self-propelled harvesting machine according to FIG. 3 in the harvesting mode.

It can be discerned in the illustration of FIG. 3, that the width x of the receiving space for the conveying channel 5 between the two wheel units 2, 5 has increased as well and is now denoted with X in the illustration of FIG. 3. The width of the receiving space X for the conveying channel 5 is now wider than the width y of the conveying channel 5, so that it can smoothly be lowered into the space between the two wheel units 2, 10. This mode, with lowered conveying channel 5 and the harvesting unit 6 mounted thereon then, is recognizable in the concluding FIG. 4 in a side view analogously to the illustration of FIG. 1. Due to the increased width of the conveying channel 5, which approximately corresponds to the allowable overall width b of the self-propelled harvesting machine 1 during drive mode on public roads, the processing unit 17 arranged in the structure 7, which is arranged behind and/or above the wheel units anyway, can also be constructed larger. An increase of the width of the conveying channel 5 and of the processing unit from, for example, 1.5 m to 2 to 2.5 m allows an increase of the output of harvested material from about 30% to about 65% without that the basic structure of the self-propelled harvesting machine 1 needs to be changed or enlarged. This enables a quicker harvest and therefore savings in machine time, labor costs and required fuel. At the same time, the structure can possibly be provided with a bigger harvesting unit 6 as the conveyance and processing of the harvested material has become more efficient now. The self-propelled harvesting machine 1 can still be driven on public roads by the conveying channel 5 being lifted corresponding to the illustration in FIGS. 1 to 3, and the overall width of the receiving space or of the vehicle, respectively, being adjusted to a smaller width x, b.

As an alternative to the crawler arrangements as wheel units 2, 10 illustrated in the exemplary embodiments, simple wheels, twin wheels or two or multiple wheels arranged one after another in the direction of travel would of course be conceivable in general. Instead of lifting the conveying channel 5 to an upper height, which is above the wheels, it would also be conceivable to design the conveying channel 5 extendable in its width y to thus—in arbitrary position together with the wheel units 2, 10 or the receiving space being created between these—adapt the channel to the respective operating mode with regard to the width y.

Figure 5:
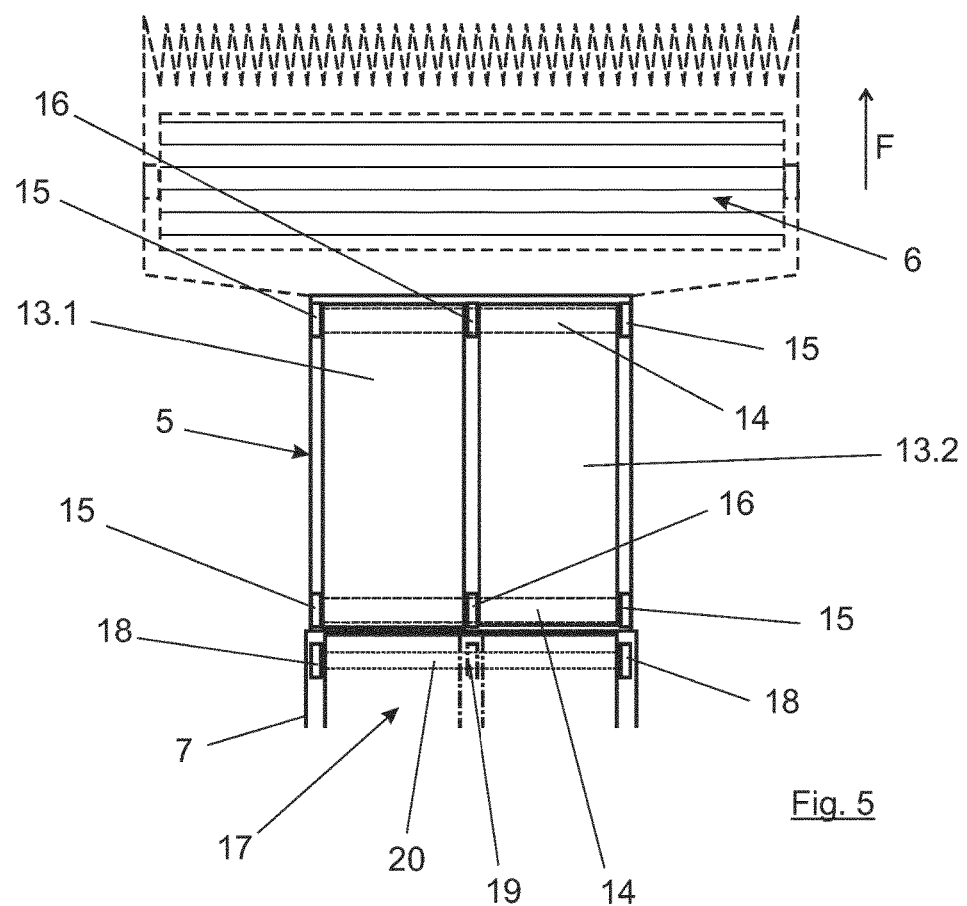
FIG. 5 a schematic plan view of a conveying channel in a possible embodiment of the invention.

As mentioned above, the conveying channel 5 and the processing unit 17 can be increased in their width. This results, in the conveying channel 5 as well as in the processing unit 17, in that shafts 14, 20 which run transvers to the direction of travel F, are exposed to a higher bending load than in conventional structures. Therefore, it may be provided that the conveying channel 5 or its transport means 13, which are indicated in FIG. 5 as conveyor belts and denoted with the reference numerals 13.1 and 13.2, can be designed two-part transverse to the direction of travel. A further bearing can be placed between the two parts. As an alternative, also two separate structures, for example with in each case a width of 1 to 1.25 m could be placed next to one another. In the illustration of FIG. 5 this is indicated by the example of the conveying channel 5 in that two indicated shafts 14 being supported outward via bearings indicated with 15 once on the end facing the indicated harvesting unit 6 and once on the end facing the structure 7 of the harvesting machine 1, in each case transverse to the direction of travel F. Additionally, the respective shaft 14 is received centered via the bearings indicated with 16, so that the bending load of the shaft 14 is decreased correspondingly by a decrease of the distance between the bearings in axial direction of the shaft, that is transverse to the direction of travel F. Here, depending on the embodiment, the transport means 13, in this case the conveyor belt, can also be designed two-part as it is indicated by the conveyor belts 13.1 and 13.2 in an exemplary manner. The conveyor belt could as well be designed not two-part as it is indicated in the FIGS. 2 and 3 in an exemplary manner.

The structure 7 follows the conveying channel 5 in the direction of travel F in which structure the processing unit mentioned multiple times already is arranged. This unit is illustrated here and denoted with the reference numeral 17. It can be designed either in one part or can be designed two-part preferably also transverse to the direction of travel F as it is indicated by the chain-dotted line. Here, too, this allows for the introduction of a centered bearing 19 besides the two lateral bearings 18 as to reduce the bending load of the shafts 20 correspondingly here as well. Analogously to the conveying channel 5, it is also conceivable here to position two separate harvesting units next to one another in the structure 7, which then may each comprise a lateral bearing 18 and a centered bearing 19 for each of their shafts 20.

The bending load of the shafts 14, 20 is reduced correspondingly, so that elaborate new constructions and designs of mechanical components can be omitted and still a higher output than in the structures of the prior art can be achieved, even though the output decreases minimally due to the centered separation compared to an unseparated structure of the conveying channel 5 and/or transport means 13 and/or the processing unit 17.

The invention claimed is:

1. A self-propelled harvesting machine for harvesting a quantity of harvested material, the self-propelled harvesting machine having:
   a removable harvesting unit, which can be mounted at a front of the self-propelled harvesting machine in a direction of travel;
   a processing unit in an interior of the self-propelled harvesting machine;
   a conveying channel for the harvested material, the conveying channel mountable to the self-propelled harvesting machine to connect the harvesting unit with the processing unit in a harvesting mode, wherein the conveying channel is adjustable in a height position at least at the front in the direction of travel, wherein the conveying channel is above the wheel units in an upper height position and at least partially between the wheel units in another height position located further downward for the harvesting mode; and
   a receiving space, which at least partially receives the conveying channel in the harvesting mode, and which is adjustable in a width thereof transversely to the direction of travel.

2. A self-propelled harvesting machine according to claim 1, wherein the receiving space is arranged between at least two wheel units comprising a right-sided wheel unit and a left-sided wheel unit located to a left and to a right of the receiving space, wherein the right-sided and left-sided wheel units are adjustable in a distance to one another, so that the receiving space changes in the width thereof.

3. A self-propelled harvesting machine according to claim 1, wherein the conveying channel is adjustable in a width thereof.

4. A self-propelled harvesting machine according to claim 1, wherein each of the wheel units comprises at least one wheel.

5. A self-propelled harvesting machine according to claim 1, wherein each of the wheel units comprises a plurality of wheels, each of the plurality of wheels arranged offset to one another in at least one of the direction of travel and in a height.

6. A self-propelled harvesting machine according to claim 5, wherein the plurality of wheels at each of the wheel units are surrounded by a track chain.

7. A self-propelled harvesting machine according to claim 1, wherein a hydraulic actuator is provided for adjustment of the width.

8. A self-propelled harvesting machine according to claim 1, wherein the conveying channel, a transport means of the conveying channel and the processing unit are designed in at least two parts transversely to the direction of travel, wherein a bearing associated with at least one of a plurality of shafts of the conveying channel, the transport means of the conveying channel and the processing unit comprises lateral bearings and at least one central bearing.

9. A self-propelled harvesting machine according to claim 3, wherein each of the wheel units comprises a plurality of wheels, each of the plurality of wheels arranged offset to one another in at least one of the direction of travel and in a height.

10. A self-propelled harvesting machine according to claim 6, wherein a hydraulic actuator is provided for adjustment of the width.

11. A self-propelled harvesting machine according to claim 5, wherein the conveying channel, a transport means of the conveying channel and the processing unit are designed in at least two parts transversely to the direction of travel, wherein a bearing associated with at least one of a plurality of shafts of the conveying channel, the transport means of the conveying channel and the processing unit comprises lateral bearings and at least one central bearing.

12. A self-propelled harvesting machine according to claim 7, wherein the conveying channel, a transport means of the conveying channel and the processing unit are designed in at least two parts transversely to the direction of travel, wherein a bearing associated with at least one of a plurality of shafts of the conveying channel, the transport means of the conveying channel and the processing unit comprises lateral bearings and at least one central bearing.

* * * * *